July 27, 1965  J. A. DICKERSON ETAL  3,197,223
COLLAPSIBLE MULTI-PURPOSE CART
Filed Feb. 7, 1963  2 Sheets-Sheet 1
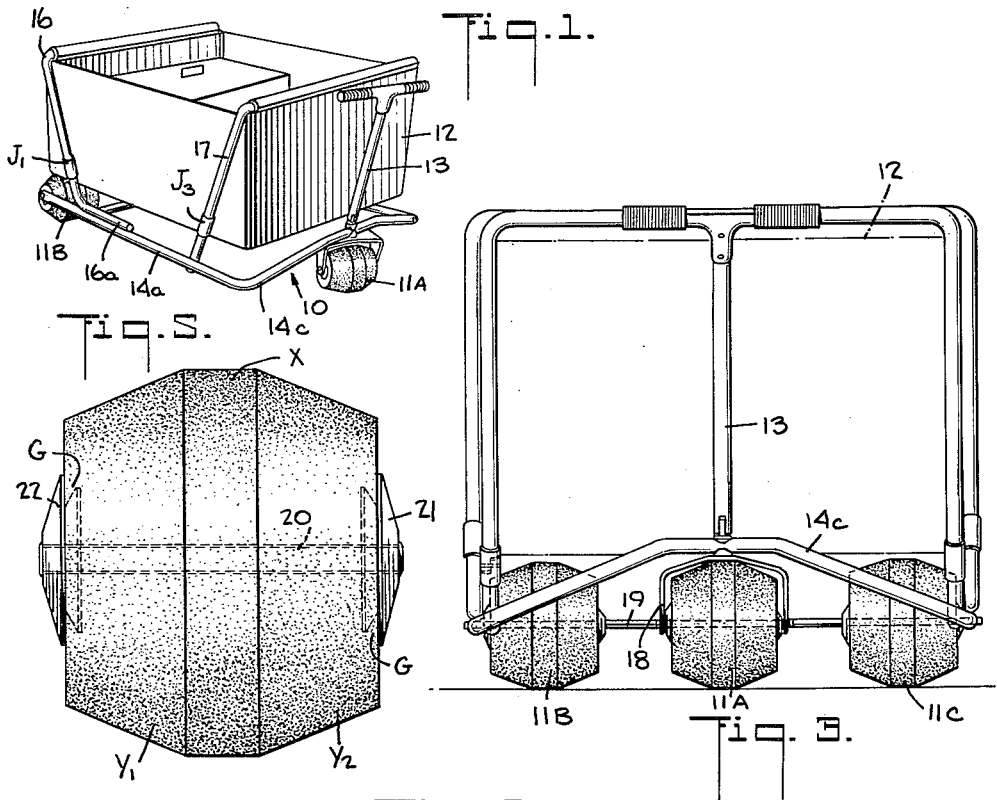
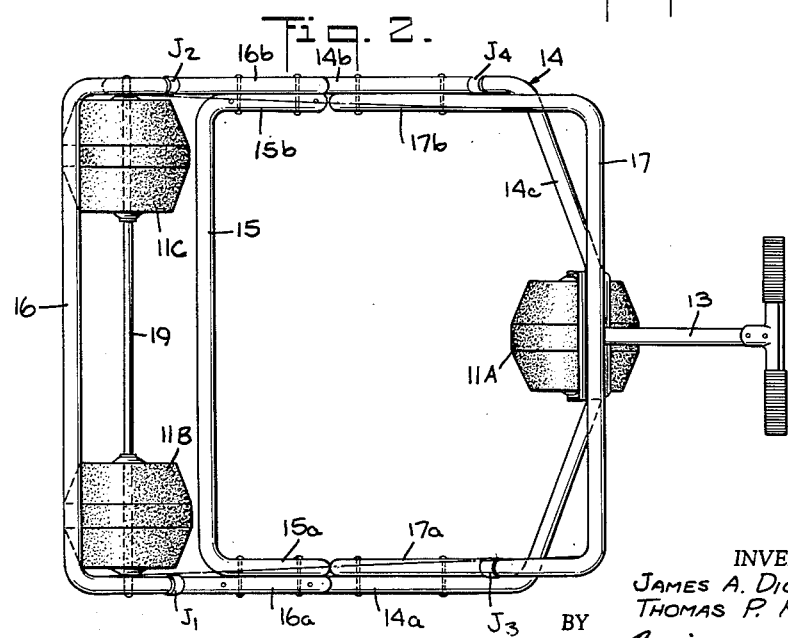
INVENTORS
JAMES A. DICKERSON
THOMAS P. ROCK
BY
ATTORNEY July 27, 1965    J. A. DICKERSON ETAL    3,197,223
COLLAPSIBLE MULTI-PURPOSE CART
Filed Feb. 7, 1963    2 Sheets-Sheet 2
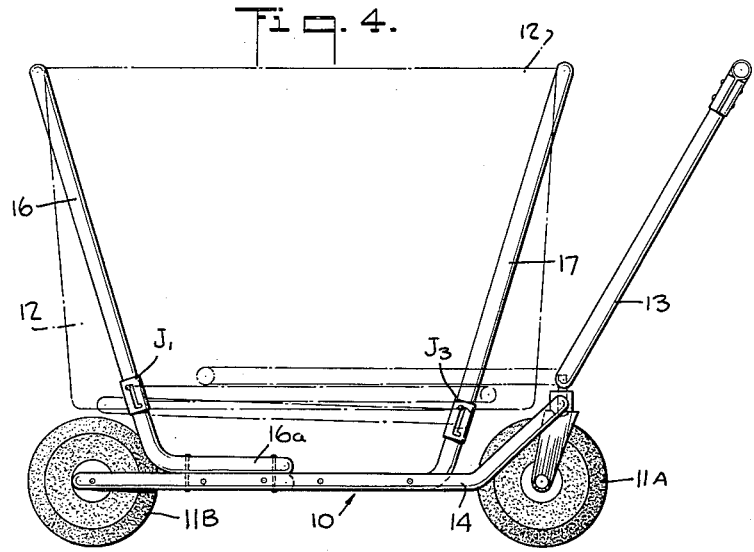
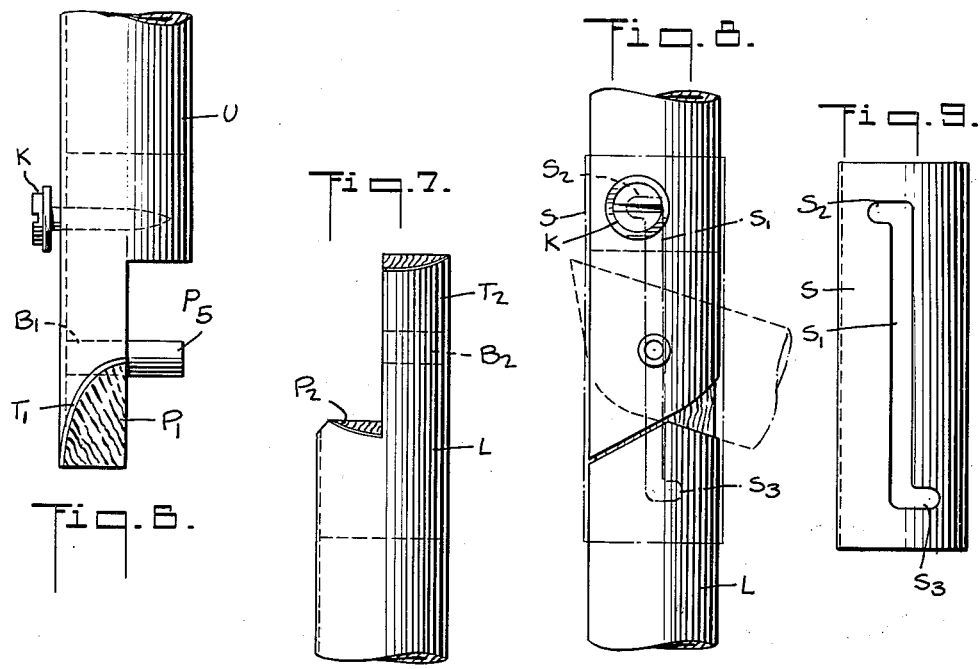
INVENTOR.
JAMES A. DICKERSON
THOMAS P. ROCK
BY
ATTORNEY

United States Patent Office 3,197,223
Patented July 27, 1965

3,197,223
COLLAPSIBLE MULTI-PURPOSE CART
James A. Dickerson, Dogwood Lane, Pomona, N.Y., and Thomas P. Rock, 199 Park St., East Orange, N.J.
Filed Feb. 7, 1963, Ser. No. 256,911
3 Claims. (Cl. 280—36)

This invention relates generally to light-weight hand-drawn wheeled carriers, and more particularly to a collapsible multi-purpose cart adapted to ride over both soft and hard surfaces.

Various forms of hand-drawn vehicles are currently available for diversified purposes. Thus, baby carriages vary in design from elaborate coach-like structures to light-weight collapsible affairs, the former being intended for daily use about the home area, and the latter serving as a temporary vehicle which may be easily carried on trips and which can be stored, for example, in the trunk of an automobile. Collapsible carriages of conventional construction have the advantage of requiring less space when not in use, but generally they are structurally weaker and less stable than the non-collapsible kind.

Shopping carts are available for carrying goods from store to home or for various other domestic purposes. Wheeled carriers which use canvas or metal containers or trays, are obtainable for transporting small loads. Each of the carriers mentioned above is designed with a specific purpose in mind, but no one carrier is sufficiently versatile to serve as a multi-purpose carry-all capable of riding on soft or hard surfaces.

Thus hand-drawn carriers have been proposed for beach use, the carriers having broad cylindrical rollers or skids which ride efficiently on a sandy surface but are difficult to steer. Conventional wheels of narrow dimensions tend to sink in sand, mud or other soft surfaces and further movement is rendered increasingly difficult. But while narrow wheels are not suitable for sand and the like, broad wheels are not well adapted to ride on hard or paved surfaces. Hence it has been proposed to equip vehicles with both forms of wheels or skids with a selective arrangement whereby operation may be switched from the broad to the narrow set. But such structures are unduly complicated and hence commercially unfeasible.

Accordingly, it is the principal object of this invention to provide a light-weight, multi-purpose three-wheeled cart which is highly maneuverable and is adapted to travel on any type of surface, sandy, muddy, or hard. Thus the cart may be used to transport articles from an automobile parking lot to a beach or recreational location, or for any other load-carrying purpose within the capacity of the cart.

Also an object of the invention is to provide a cart of the above type which may readily be collapsed and which occupies relatively little storage space in collapsed form. A significant feature of the invention resides in the fact that the cart, despite its collapsibility, is of great structural strength and yet light-weight.

A further object of the invention is to provide a collapsible cart which may be easily and quickly erected for use, or collapsed for storage.

It is yet another object of this invention to provide a cart having a large load-carrying capacity, the load being conveyed in a tray or basket of flexible material suspended at either end from arched frame sections which are able to withstand relatively heavy loads. Another advantage of the invention is that it has a low center of gravity, thereby minimizing tipping.

Still another object of the invention is to provide a multi-purpose collapsible cart of the above-noted type which may be manufactured inexpensively on a mass scale.

Briefly stated, these objects are accomplished in a structure comprising a bed frame borne on rollers, front and rear arched frame sections being secured to the bed frame between which sections a flexible basket is suspended, the front and rear sections being articulated whereby the sections can be folded down over the bed frame, thereby to collapse the cart.

The rollers are constituted by resilient bodies having a central cylindrical wheel portion which is relatively narrow, and a pair of conical portions on either side of the central portion, whereby the effective tread surface of each roller on soft or sandy ground is the combined surface of the three portions to provide efficient traction thereover, whereas the effective tread surface on hard ground is only the narrow surface of the central wheel portion. Thus the same roller is operative for all ground conditions.

For a better understanding of the invention as well as other objects and further features thereof, reference is made to the following detailed description to be read in conjunction with the accompanying drawing, wherein like reference numerals in the several figures designate like components.

In the drawing:

FIG. 1 is a perspective view of a collapsible cart in accordance with the invention;

FIG. 2 is a plan view showing the frame, rollers and handle of the cart;

FIG. 3 is a front view of the frame;

FIG. 4 is a side view of the frame;

FIG. 5 shows one of the rollers;

FIG. 6 is the upper section of an articulated frame element;

FIG. 7 is the lower section of said section;

FIG. 8 shows the two sections of the frame joined together; and

FIG. 9 is the sliding sleeve for holding the articulated frame element erect.

Referring now to the drawing, the collapsible multi-purpose cart in accordance with the invention comprises a frame assembly, generally designated by numeral 10, three rollers 11A, 11B and 11C mounted for rotation within said frame assembly, a flexible basket 12 suspended within said assembly, and a handle 13 pivotally connected to said assembly for pulling or maneuvering the cart.

The frame assembly 10 is formed of tubular metal such as aluminum, and as best seen in FIGS. 2, 3 and 4, is constituted by a U shaped bed frame section 14 having rearwardly-extending side pieces 14a and 14b. The bed frame section is reinforced by a cross-bar section 15 having opposing legs 15a and 15b riveted to side pieces 14a and 14b.

Secured by rivets or other means to the side pieces 14a and 14b of the bed frame is an upwardly-extending and rearwardly-inclined arched back frame section 16, having side arms 16a and 16b which are articulated at joints $J_1$ and $J_2$ located adjacent the bed frame section, whereby the back frame section may be folded downwardly thereover. Also attached to side pieces 14a and 14b is an upwardly-extending and forwardly-inclined arched front frame section 17 having side arms 17a and 17b which are articulated at joints $J_3$ and $J_4$ located adjacent the bed frame section, whereby this section may also be folded downwardly thereover.

The joints $J_1$, $J_2$, $J_3$ and $J_4$ on the front and rear frame section side arms are all of identical construction, the details of which are shown in FIGS. 6 to 9. Each side arm at the joint is cut into two portions, FIG. 6 showing the upper portion U, and FIG. 7 the lower portion L. Forced within the hollow ends of the upper and lower portions are plugs $P_1$ and $P_2$, respectively, which may be of birch or any other suitable material. The ends of these portions are notched to provide complementary tongues $T_1$ and $T_2$, and a pivoted connection therebetween is provided by a slotted pin $P_5$ of resilient metal, which is inserted in aligned transverse bores $B_1$ and $B_2$ drilled through the tongues. Slidably received over the pivoted ends of the upper and lower portions U and L of the arm is a sleeve S having a longitudinal slot $S_1$ formed therein, the main slot $S_1$ terminating at either end in stub slots $S_2$ and $S_3$ extending laterally in opposing directions.

The sliding movement of the sleeve S is limited by a screw K which passes through the slot therein and is anchored in plug $P_1$ of the upper portion U. In the erect position of the frame, the two portions U and L are in alignment, as shown in FIG. 8, and the sleeve S embraces both sections of the joint to maintain this condition. The sleeve is held in locking position when the limit screw K occupies stub slot $S_2$. To lift the sleeve and unlock the joint, the sleeve is twisted to cause limit screw K to align with longitudinal slot $S_1$, the sleeve is then raised until the screw is in line with stub slot $S_3$, and the sleeve is again twisted so that it is held in raised position. At this position, the upper portion U is free to pivot downwardly, as shown in FIG. 8.

The roller 11A is supported centrally below the bed frame front piece 14C by means of a pivoting yoke 18 which is coupled to the handle 13, whereby the roller may be turned to maneuver the cart. The other rollers 11B and 11C are mounted on an axle 19 journaled in the side pieces 14a and 14b.

Each roller, as best seen in FIG. 5, is formed of a resilient material, such as latex, foam rubber, polyethylene, or vinyl, urethane or any other foamed or molded material, the roller being molded about a metal bushing 20 terminated at either end by bearing blocks 21 and 22, preferably of hardwood, or any other material integral with or added to the roller. The bearing blocks are formed with an annular groove G of triangular cross-section, the roller material filling said groove to key the bearing to the roller. A mounting axle passes through the bushing.

The roller has a central, relatively narrow cylindrical portion X and truncated conical portions $Y_1$ and $Y_2$ projecting from either side of the central portion, the portions $Y_1$ and $Y_2$ having a trapezoidal section. Thus the tread surface of the roller engaging the ground is inclined upwardly on either side of the central cylinder. On a hard surface, such as a paved road, only the central cylinder makes road contact, hence in effect the roller acts as a relatively narrow wheel and the cart may be pulled and easily steered on the hard surface. But on a soft or sandy surface, where the rollers tend to sink into the ground, bearing engagement is effective over the full width of the roller, thereby providing an extended surface preventing the rollers from sinking too deeply and making easy movement possible.

The arrangement is such, as shown in FIG. 4, that the front frame section may be folded first, the rear section may then be folded over the front section, and the handle folded over the rear section, thereby providing a highly compact structure.

The basket 12 is essentially in the form of an open rectangular box formed of reinforced canvas, nylon mesh, duck, vinyl, or any other form of flexible material of high strength, and it is suspended from the arched front and back frame sections. Thus suspension may be effected in various ways, as by means of end flaps or pockets on the basket which fold over the arches and then buttoned, latched or otherwise connected to the ends of the basket. Alternatively, connecting rings or any other form of linkage, may be used for this purpose. A hard floor of press-board or Masonite may be placed within the basket.

When the cart is collapsed, as shown in FIG. 4, the basket is also folded between the bed frame and the rear and front frame sections.

While there has been shown a preferred embodiment of collapsible cart in accordance with the invention, it will be appreciated that many changes and modifications may be made therein without, however, departing from the essential spirit of the invention as defined in the annexed claims.

1. A multi-purpose cart ridable on both soft and hard ground comprising a bed frame having rearwardly-extending side pieces and a connecting front piece, a front arched frame section secured between said side pieces adjacent said front piece, a rear arched frame section secured between said side pieces adjacent the rear end thereof, a flexible basket suspended between said front and rear sections, said sections being articulated whereby they may be folded down over the bed frame to collapse said basket, a pair of rear rollers mounted on an axle extending between said side pieces, a single front roller mounted centrally on a swivel below said front piece, a handle pivotally coupled to said swivel to turn said front roller to pull and steer said cart, said handle when said basket is collapsed folding over the folded down sections said rollers being constituted by resilient bodies having a relatively narrow central cylindrical portion and a pair of conical portions on either side thereof, whereby the effective tread surface of each roller on soft ground is the combined surfaces of the three portions to provide efficient traction thereover, the effective surface on hard ground being solely the central wheel portion.

2. A cart as set forth in claim 1 wherein said sections are articulated by pivoted joints having a sleeve surrounding the jointed sections to lock and unlock the joint.

3. A cart as set forth in claim 1 wherein said rollers are formed of foamed plastic molded about bearing blocks, having an annular groove to key the bearing to the roller.

References Cited by the Examiner

UNITED STATES PATENTS

| | | | |
|---|---|---|---|
| 793,711 | 7/05 | Broderick | 152—352 |
| 1,346,218 | 7/20 | Lee | 280—11.26 |
| 1,718,962 | 7/29 | Kimball | 280—36 |
| 2,337,670 | 12/43 | LeTourneau. | |
| 2,389,574 | 11/45 | Hulquist | 280—47.34 |
| 2,468,390 | 4/49 | Binz | 280—36 |
| 2,902,072 | 9/59 | Reuter. | |
| 2,978,277 | 4/61 | Gaudry. | |

ARTHUR L. LA POINT, *Primary Examiner.*